UNITED STATES PATENT OFFICE.

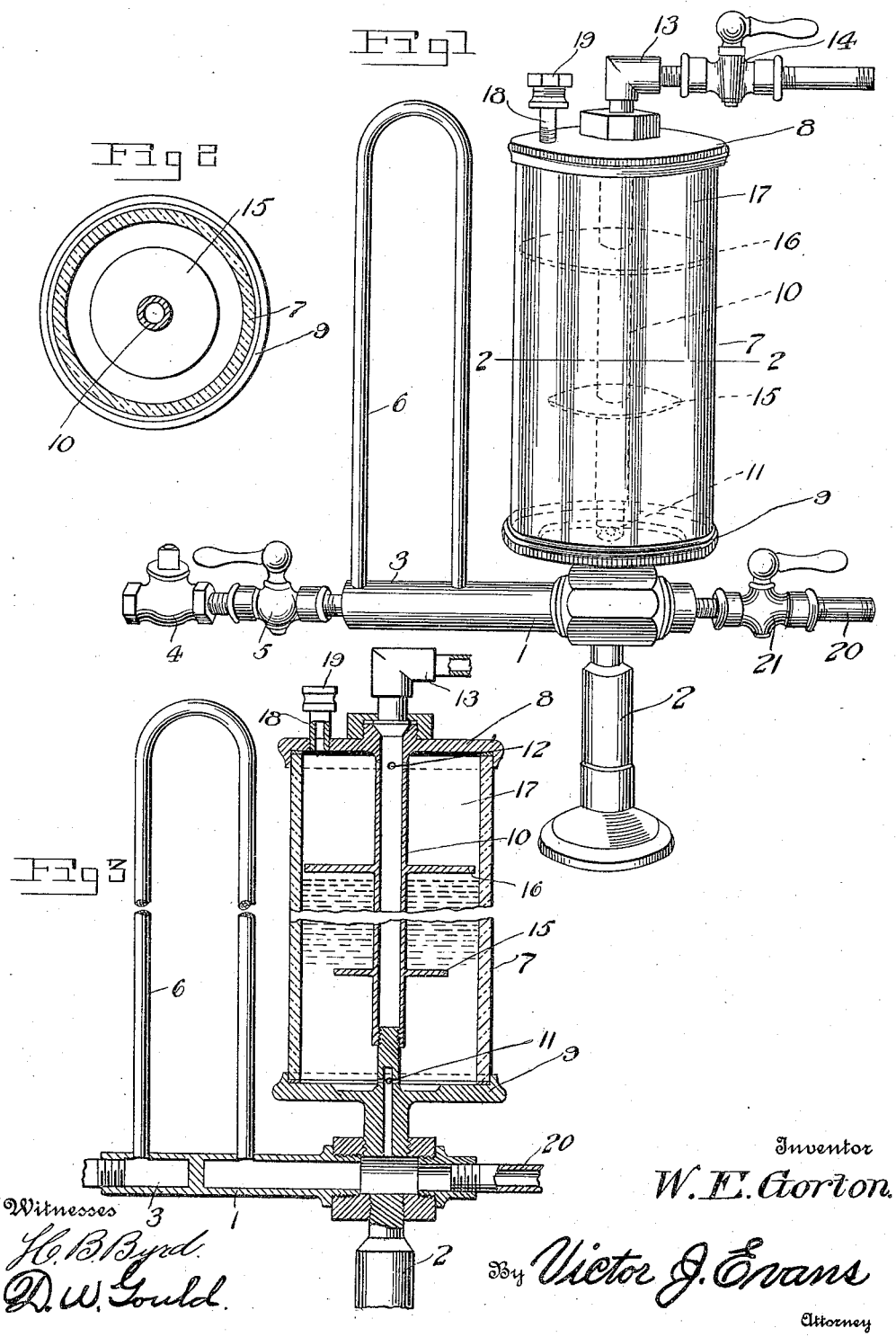

WILLIAM E. GORTON, OF ST. JOSEPH, MISSOURI, ASSIGNOR OF ONE-HALF TO WILLIAM F. HOFFMAN, OF ST. JOSEPH, MISSOURI.

FILTER.

1,154,507.  Specification of Letters Patent.  Patented Sept. 21, 1915.

Application filed April 10, 1914. Serial No. 831,031.

*To all whom it may concern:*

Be it known that I, WILLIAM E. GORTON, a citizen of the United States, residing at St. Joseph, in the county of Buchanan and State of Missouri, have invented new and useful Improvements in Filters, of which the following is a specification.

The invention relates to an improvement in filters, designed primarily for washing or purifying air delivered to a filter under pressure.

The main object of the present invention is the provision of a filter adapted to be connected to a source of air in a series of fine streams through a body of cleansing fluid, whereby the air is thoroughly washed and cleansed for use.

The invention in the preferred form of details will be described in the following specification, reference being had particularly to the accompanying drawings, in which:—

Figure 1 is a perspective showing the improvement, Fig. 2 is a section on line 2—2 of Fig. 1. Fig. 3 is a vertical section through the filter.

Referring particularly to the accompanying drawings, the improved filter comprises a main chamber 1 in the form of a pipe conduit supported upon a suitable base 2, the conduit being extended to form an inlet chamber 3, closed against communication with the chamber 1 through the conduit. The air or other fluid to be cleansed is admitted from a pressure tank (not shown) through a check valve 4, and a stop cock 5 to the chamber 3, said chambers 3 and 1 being in communication through a vertically arranged loop formed stand pipe 6, the respective ends of which are in direct communication with the respective chambers.

A filter proper comprises a cylinder 7 preferably of glass supported between ends 8 and 9, the latter forming the bottom of the filter and being connected directly to the conduit forming the main chamber 1. A standard 10 connects the ends 8 and 9, the lower portion of the standard being wholly and in direct communication with the chamber 1, the hollow portion of the standard within the casing 7 being formed with a series of annually disposed ports or comparatively minute openings 11. The relatively upper portion of the standard is also hollow and formed with a series of inlet ports or openings 12 to admit air to the interior of the standard near the upper end of the casing and this portion of the standard is in communication with the pipe 13 extending beyond the casing or filter proper and leading to any storage point or place of use, a stop cock 14 controlling the supply.

Within the filter above the ports 11 is arranged a deflector 15 in the form of a plate having a diameter materially less than that of the casing 7, a second baffle plate 16 being also supported from the standard above the plate 15 but below the openings 12, the space 17 included between the plate 16 and the top of the filter proper comprising an air chamber.

The top 8 of the filter is provided with a filling opening or pipe 18 having a cap 19, and an outlet pipe 20 controlled by a stop cock 21 communicates with the chamber 1 below the filter.

In use, the air or other fluid under pressure is admitted to the chamber 1, flowing through the loop standard 6. Such fluid or air is delivered to the filter proper in a series of fine streams through the openings 11, which streams are deflected and broken up by the plate 15, during their passage through the cleansing fluid contained within the casing below the plate 16. The fluid to be cleaned finds its way around the edges of the baffle plate 16 into the chamber 17 and to the delivery pipe through the opening 12.

It is noted of course that the extreme upper portion of the loop standard 6 is on a plane above the extreme upper limit of the filter proper, so that the backward flow of the cleansing fluid into the chamber 3 is prevented.

In placing the cleansing fluid within the filter proper, the stop cocks 5 and 14 are closed, the cap 19 removed and the cleansing fluid delivered to the casing to a point approximating the height of the baffle plate, whereupon the stop cocks are again opened and the filter is ready for use. The cleansing fluid can be removed by closing the stop cocks 5, 14, opening stop cock 21 and admitting air by opening the filling aperture.

What is claimed is:—

In a device of the character described, in combination, a stand, a cylindrical shell, a cover closing one end of said shell, a pipe depending from the bottom of said cover and projecting centrally and vertically into said shell, said pipe terminating short of the opposite end of said cylinder, a bottom cover closing the opposite end of said shell, a cylindrical stub formed upon said bottom cover being provided with means for making connection with said pipe whereby to clamp said covers tight, an integral hollow piece formed upon said bottom cover, means for conducting air into said hollow piece, said stub having a channel communicating with said hollow piece and having air-ejecting ports, said pipe having ports at its upper end, and a series of horizontal baffles of varying diameters formed upon said pipe.

In testimony whereof I affix my signature in presence of two witnesses.

WILLIAM E. GORTON.

Witnesses:
JAMES W. POTTS,
HOMER A. OSBORN.